US010551634B2

(12) United States Patent
Gyotoku

(10) Patent No.: US 10,551,634 B2
(45) Date of Patent: Feb. 4, 2020

(54) BLUR CORRECTION DEVICE, IMAGING APPARATUS, AND BLUR CORRECTION METHOD THAT CORRECT AN IMAGE BLUR OF AN OBJECT IN A TARGET IMAGE REGION

(71) Applicant: CANON KABUSHIKI KAISHA, Tokyo (JP)

(72) Inventor: Takashi Gyotoku, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 212 days.

(21) Appl. No.: 15/688,951

(22) Filed: Aug. 29, 2017

(65) Prior Publication Data
US 2018/0067334 A1    Mar. 8, 2018

(30) Foreign Application Priority Data
Sep. 7, 2016   (JP) .................................. 2016-174682

(51) Int. Cl.
G03B 13/36        (2006.01)
G02B 27/64        (2006.01)
G01P 3/36         (2006.01)
H04N 5/232        (2006.01)

(52) U.S. Cl.
CPC .............. *G02B 27/64* (2013.01); *G01P 3/36* (2013.01); *H04N 5/232* (2013.01)

(58) Field of Classification Search
CPC .................................. G02B 27/64; G03B 13/36

USPC ............................. 396/123, 124; 348/208.11
See application file for complete search history.

(56) References Cited

U.S. PATENT DOCUMENTS
2016/0301858 A1* 10/2016 Aoyama ............ H04N 5/23222

FOREIGN PATENT DOCUMENTS
JP              3112472 B2      11/2000

* cited by examiner

*Primary Examiner* — Clayton E. LaBalle
*Assistant Examiner* — Fang-Chi Chang
(74) *Attorney, Agent, or Firm* — Venable LLP

(57) ABSTRACT

A processor of a blur correction device functions as a detection unit configured to detect motion information between a plurality of images imaged by an imaging apparatus, the detection unit detecting motion information of a plurality of image regions, and a determination unit configured to determine a target region, among the plurality of image regions, based on motion information of the imaging apparatus and motion information of a first direction detected by the detection unit. The processor also functions as a correction control unit configured to switch between a control operation in which the correction control unit corrects an image blur in a second direction of an object present in the target region based on motion information of the second direction orthogonal to the first direction in the target region, and a control operation in which the correction control unit does not correct the image blur in the second direction.

16 Claims, 13 Drawing Sheets

BLUR CORRECTION DEVICE, IMAGING APPARATUS, AND BLUR CORRECTION METHOD THAT CORRECT AN IMAGE BLUR OF AN OBJECT IN A TARGET IMAGE REGION

This application claims the benefit of Japanese Patent Application No. 2016-174682, filed Sep. 7, 2016, which is hereby incorporated by reference herein in its entirety.

BACKGROUND OF THE INVENTION

Field of the Invention

The present invention relates to a process that detects an object and corrects an image blur using a motion vector in a panning shot.

Description of the Related Art

In a panning shot by a camera (a method of shooting at a shutter speed slower than usual while tracking a moving object), an image in which an object is stationary while the background flows can be obtained, and, consequently, a photo giving a full sense of speed can be shot. Due to a long-second shooting in a panning shot, however, it is difficult to match a moving speed of the object to a speed of moving a camera during an exposure period, and thus, a skilled technique is required for shooting.

Methods that easily realize a panning shot include a method that detects a difference between the speed of the object and the speed of moving the camera and corrects a deviation amount corresponding to the difference in speed by a movement of a shift lens.

Here, it is important to more accurately obtain an angular velocity of the object, specifically, a direction and an angular velocity at which a photographer should perform panning of the camera in accordance with the object in order to stop the image of the object aimed at by the photographer. If an error occurs in this calculation, an error will occur in the correction by the shift lens, and the amount of error appears in the captured image as a remaining blur of the image. In the technique disclosed in Japanese Patent No. 3112472, a movement of the object is detected by a video image signal, and moreover, a vibration due to camera shaking is detected by using a mechanical vibration sensor. The moving speed of the object is calculated based on the moving amount of the object and the vibration amount of the camera shaking.

In the conventional technique disclosed in Japanese Patent No. 3112472, it is difficult to accurately determine a main object in the horizontal direction and the vertical direction in an imaging screen during a panning operation in a panning shot. If the user performs the panning operation maintaining an angle in the traveling direction of the main object (moving object), it is difficult to suppress image blur of the object image.

SUMMARY OF THE INVENTION

The present invention corrects image blur in the panning shot by more accurately determining an object in a shooting screen.

In one aspect, the present invention provides a blur correction device including a memory, and at least one processor that executes a program stored in the memory to function as a detection unit configured to detect motion information between a plurality of images imaged by an imaging apparatus, the detection unit detecting motion information of a plurality of image regions, a determination unit configured to determine a target region from among the plurality of image regions based on motion information of the imaging apparatus and motion information of a first direction detected by the detection unit, and a correction control unit configured to correct an image blur in a second direction of an object present in the target region based on motion information of the second direction orthogonal to the first direction in the target region determined by the determination unit.

Further features of the present invention will become apparent from the following description of exemplary embodiments with reference to the attached drawings.

DESCRIPTION OF THE EMBODIMENTS

The following embodiments will be described as preferred embodiments of the present invention. In the present specification, as a technique that supports a user's panning shot, a method that suppresses a difference between a moving speed of the object and a panning speed by a movement of a movable optical member is referred to as "panning shot assist". A mode in which the panning shot assist is set is referred to as a "panning shot assist mode".

First Embodiment

Figure 3:
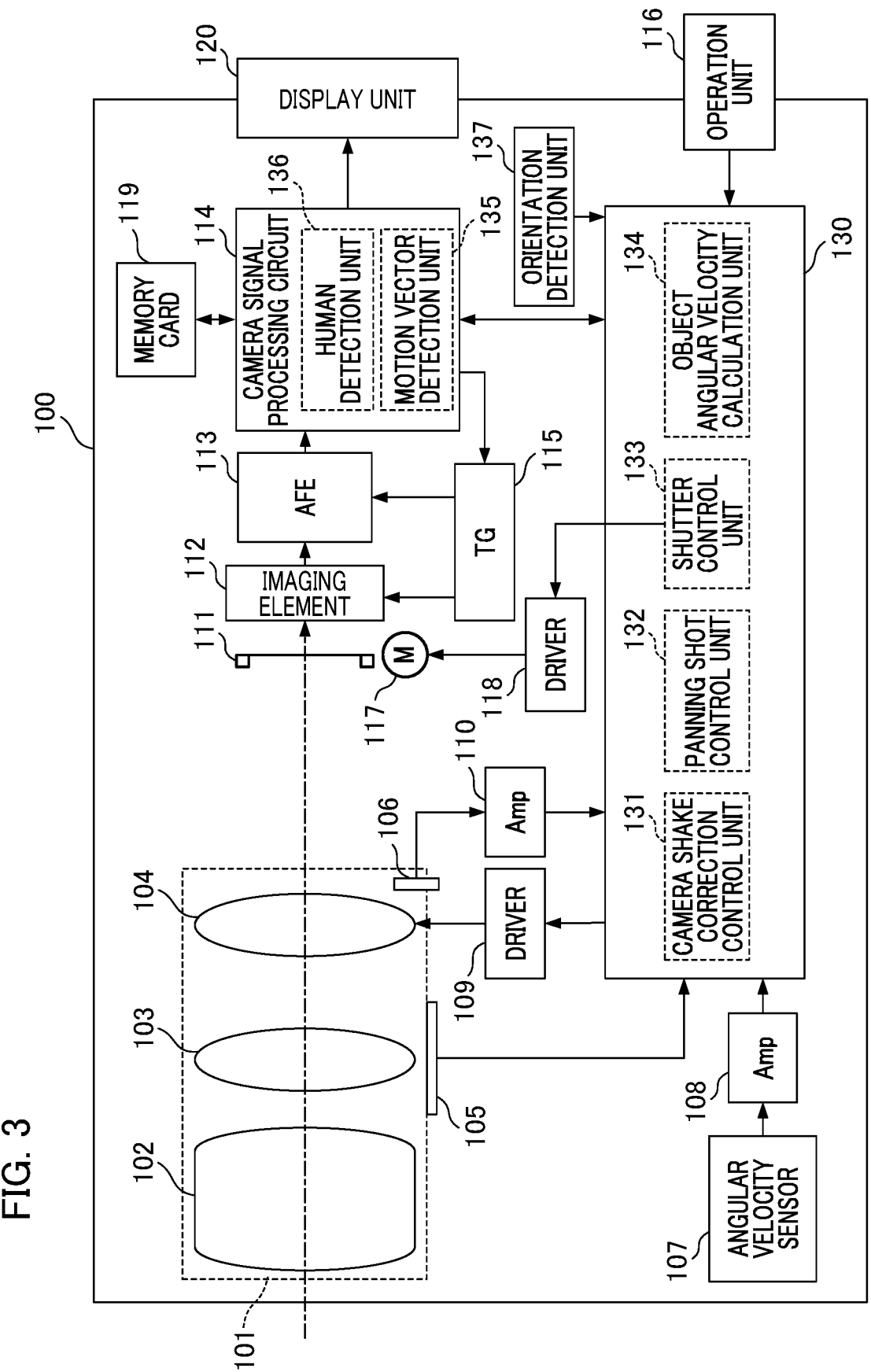
FIG. 3 is an overall configuration view illustrating a configuration example of an imaging apparatus.

Hereafter, a description will be given of an imaging apparatus that corrects an image blur according to a first embodiment of the present invention. FIG. 3 is a block diagram illustrating a configuration example of an imaging apparatus 100 of the present embodiment. As an example of the imaging apparatus 100, a camera with a built-in lens will be described. A lens unit 101 of the imaging apparatus 100 is provided with a main imaging optical system 102, a zoom lens group 103 that can change a focal length, and a movable optical member that corrects image blur. In the present embodiment, a configuration for optically correcting an image blur with respect to the optical axis caused by shaking of the imaging apparatus 100 is illustrated. A shift lens group 104 is a correction lens that moves in a direction perpendicular to the optical axis to change the imaging position on an imaging element and correct an image blur. A zoom encoder 105 detects the position of the zoom lens group 103. A position sensor 106 detects the position of the shift lens group 104.

An angular velocity sensor 107, using a gyro sensor, and the like, detects shaking of the imaging apparatus 100 and outputs shake detection signals. An amplifier 108 amplifies the output of the angular velocity sensor 107 and outputs it to a control unit 130. The control unit 130 is provided with a camera control microcomputer and integrally controls each unit of the imaging apparatus 100 in accordance with a program stored in a memory. A driver 109 is a drive circuit for driving the shift lens group 104. An amplifier 110 amplifies the output of the position sensor 106 of the shift lens group 104 and outputs it to the control unit 130.

A shutter 111 adjusts an exposure time of an imaging element 112. The imaging element 112 is a complementary metal oxide semiconductor (CMOS) image sensor, and the like, receives lights from an object through the lens unit 101, and outputs electrical signals by photoelectric conversion. An analog signal processing circuit 113 processes the output signals of the imaging element 112 and outputs the signals to a camera signal processing circuit 114. A timing generator 115 sets operation timings of the imaging element 112 and the analog signal processing circuit 113. An operation unit 116 is provided with, for example, a power switch, a release switch, and a setting switch of the panning shot assist mode.

A shutter drive motor 117 is a drive source of the shutter 111, and, during the shutter operation, the motor is driven by signals from a driver 118. A memory card 119 is a recording medium on which image data subjected to a recording process is recorded after shooting. A display unit 120 is a monitor display device for an image to be shot by a user, and displays the shot images, and the like. For example, the display unit 120 is provided with a liquid crystal display panel and performs a live view display by continuously displaying shot video images.

An orientation detection unit 137 detects an orientation of the imaging apparatus 100 in the direction of gravity and outputs detection signals to the control unit 130. It is possible to determine whether the user is holding the imaging apparatus 100 horizontally (normal position) or vertically (vertical position) in response to the detection signals of the orientation detection unit 137. An acceleration sensor, and the like, can be used as the orientation detection unit 137.

The camera signal processing circuit 114 is provided with a motion vector detection unit 135 and a human detection unit 136. The motion vector detection unit 135 detects a motion vector, which is motion information of an image, from a plurality of captured image data (hereafter, referred to as a "captured image") with different shooting times. The human detection unit 136 detects an image region of the object (human) in the captured image.

In FIG. 3, main functions of the control unit 130 are shown as functional blocks. A camera shake correction control unit 131 performs a camera shake correction control based on the detection signal of the angular velocity sensor 107. A panning shot control unit 132 performs control for a panning shot assist. A shutter control unit 133 performs a drive control of the shutter 111. An object angular velocity calculation unit 134 calculates an angular velocity of the object. Note that although the control unit 130 also performs focus adjustment control, aperture control, and the like, by drive control of the focus lens in the lens unit 101, such operations are omitted for simplifying the illustration. Additionally, in the camera shake correction control, although detection and correction are respectively performed on two orthogonal axes, such as the horizontal direction and the vertical direction of the imaging apparatus 100, a description will be given of only one axis since the same configuration is used in each direction.

If the power source of the imaging apparatus is turned ON by a power switch that is provided in the operation unit 116, the control unit 130 detects this change of state, and a power is supplied to each circuit of the imaging apparatus 100 and the initial setting is performed. In the normal mode in which the panning shot assist mode is not set, the angular velocity sensor 107 detects the shaking of the imaging apparatus 100 due to camera shaking and the like. The camera shake correction control unit 131 drives the shift lens unit 104 in response to the shake detection signals detected by the angular velocity sensor 107, and the camera shake correction operation is performed. The camera shake correction function will be described with reference to FIG. 4.

Figure 4:
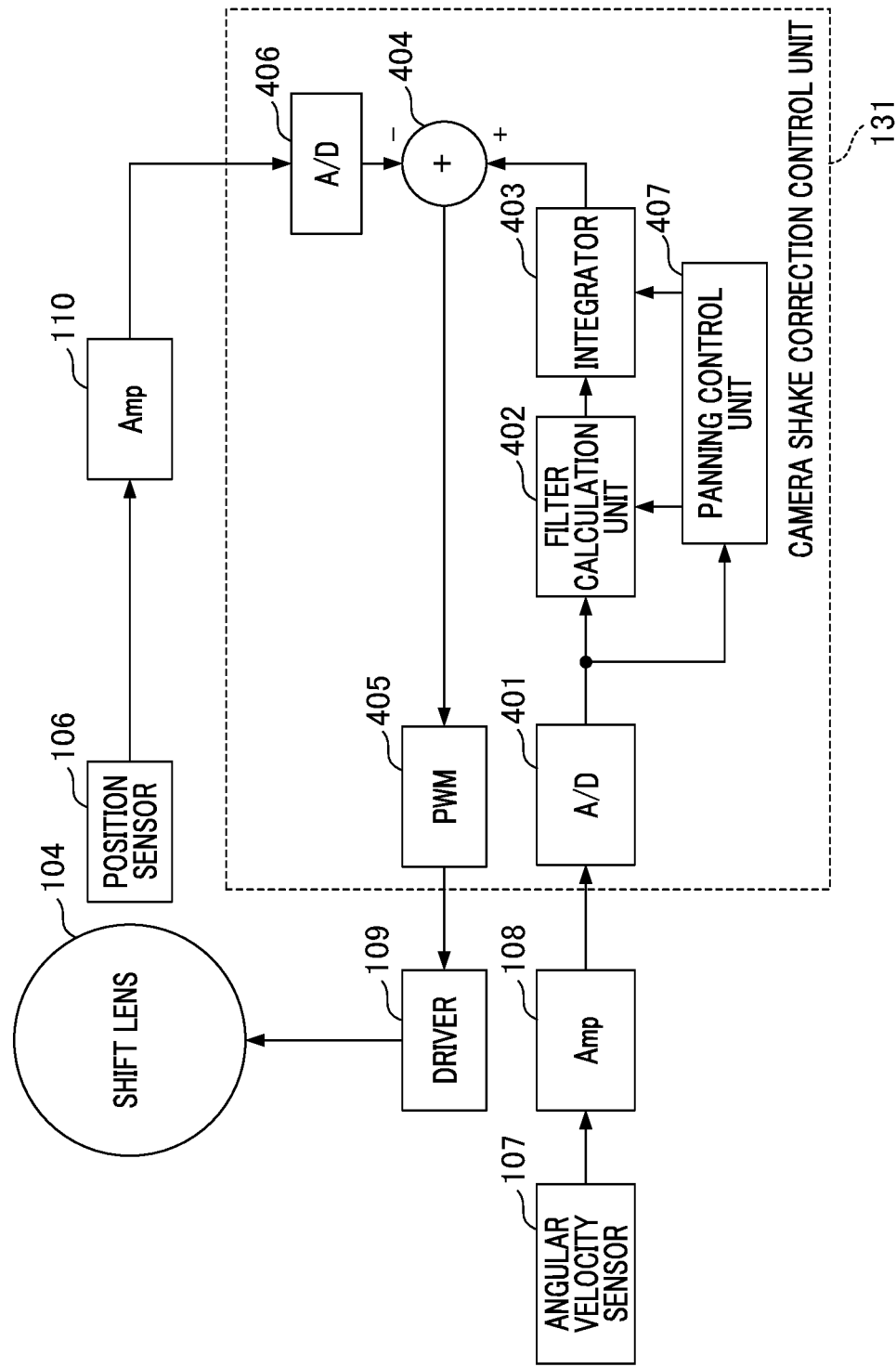
FIG. 4 is a configuration view of a camera shake correction control unit.

FIG. 4 is a block diagram illustrating a configuration example focusing on the camera shake correction control unit 131. In FIG. 4, the same reference numerals are provided for parts that are the same as those in FIG. 3, and a detailed description thereof will be omitted. The camera shake correction control unit 131 is provided with an analog/digital (A/D) converter 401, and converts the shake detection signals into digital signals. The shake detection signals are input to the A/D converter 401 as signals that have been detected by the angular velocity sensor 107 and amplified by the amplifier 108. The output data of the angular velocity sensor 107 is sampled at approximately 1 to 10 kHz.

A filter calculation unit 402 is provided with a high pass filter (HPF), and performs panning countermeasures by removing an offset component included in the output of the angular velocity sensor 107, and changing a cut-off frequency. The output of the filter calculation unit 402 is input to an integrator 403. The integrator 403 converts angular velocity data into angular displacement data in order to generate drive target data for the shift lens group 104. The filter calculation unit 402 and the integrator 403 are controlled by a panning control unit 407 to be described below.

The A/D converter 406 converts the position signals of the shift lens group 104 detected by the position sensor 106 into digital data. The output signal of the position sensor 106 is amplified by the amplifier 110 and is input to the A/D converter 406. The adder 404 performs a subtraction process using the output of the integrator 403 to serve as a positive input and using the output of the A/D converter 406 to serve as a negative input. In other words, the actual drive amount data of the shift lens group 104 is calculated by subtracting a value of the detection position of the current shift lens from a drive target value of the shift lens group 104. A PWM (pulse width modulation) output unit 405 receives the drive amount data calculated by the adder 404, generates a PWM signal in accordance with the data, and outputs the signal to the driver 109 for the drive of the shift lens group 104. As a result, a feedback control of the shift lens group 104 is realized.

Figure 5:
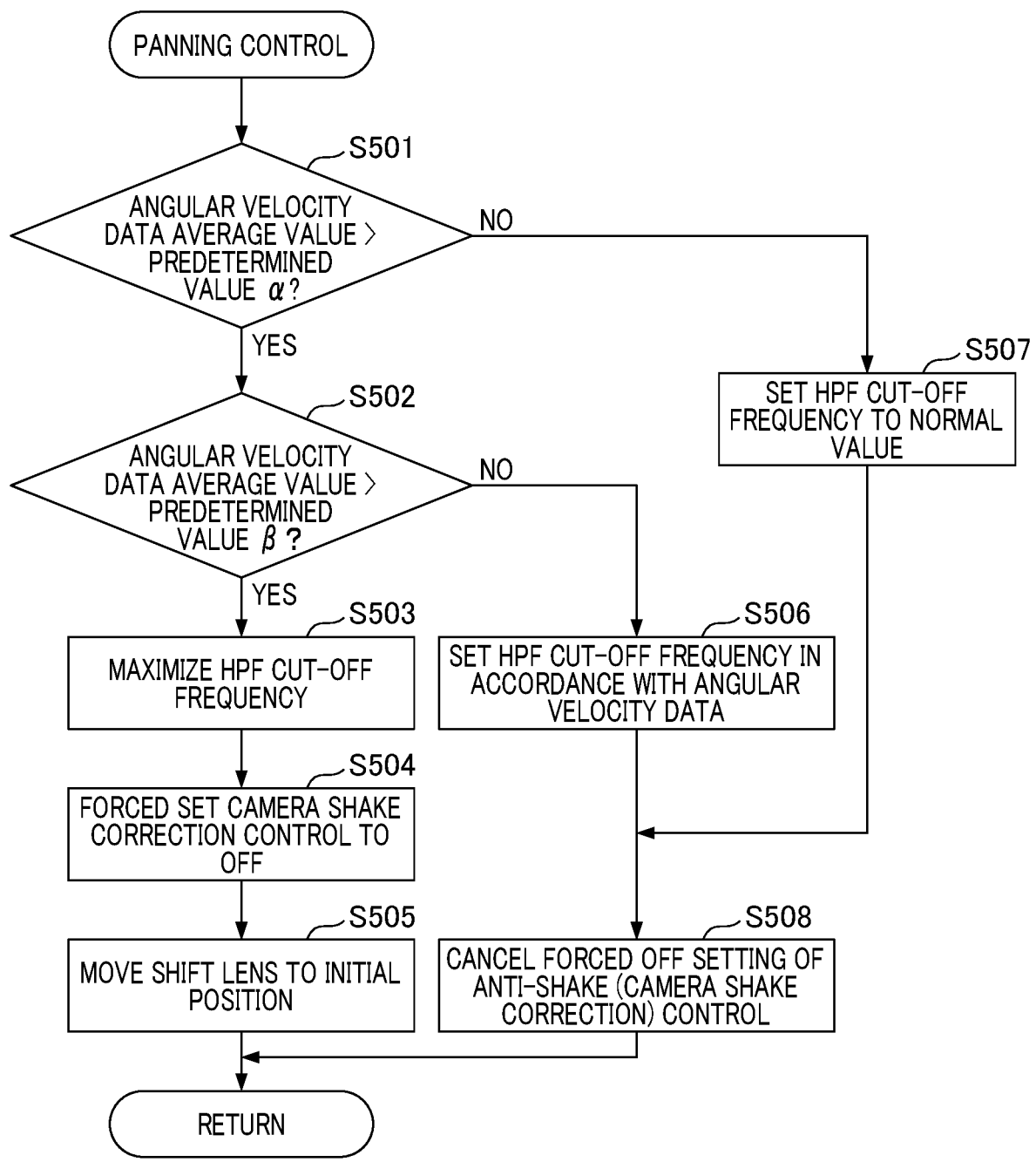
FIG. 5 is a flowchart that explains a panning control.

The panning control unit 407 obtains the output data of the A/D converter 401 and determines whether or not the panning operation of the imaging apparatus 100 has been performed based on a state shown by the angular velocity data. If the panning control unit 407 determines that the panning operation has been performed, it performs control to change the characteristics of the filter calculation unit 402. Specifically, the panning control unit 407 performs control to change the cut-off frequency of the filter in the filter calculation unit 402 and to adjust the output of the integrator 403. With reference to FIG. 5, an example of the panning control will be described.

FIG. 5 is a flowchart illustrating panning control by the camera shake correction control unit 131. In step S501, the panning control unit 407 compares an average value of the angular velocity data input by the A/D converter 401 (average value for the number of the predetermined sampling) with a predetermined value. The predetermined value is a threshold value for the determination and is denoted by "α". The panning control unit 407 determines whether or not the average value of the angular velocity data is greater than the predetermined threshold value. If the average value of the angular velocity data is greater than the predetermined value α, the process proceeds to step S502. If the average value is equal to or less than the predetermined value α, it is determined that panning is not being performed, and the process proceeds to step S507.

In step S502, the panning control unit 407 further compares the average value of the angular velocity data with a predetermined value (referred to as "β"). The magnitude of the predetermined value β is assumed to be greater than the magnitude |α| of the predetermined value α. If the panning control unit 407 determines that the average value of the angular velocity data is greater than the predetermined value β and a rapid panning operation is being performed, the process proceeds to step S503. Additionally, if the average value of the angular velocity data is equal to or less than the predetermined value β, the panning control unit 407 determines that a slow panning operation is being performed, and the process proceeds to step S506.

In step S503, the panning control unit 407 sets the cut-off frequency of the HPF in the filter calculation unit 402 to the maximum value, and forces the camera shake correction control to be set to off in the next step S504. The setting of step S503 is executed so that the shift lens gradually stops by increasing the cut-off frequency of the HPF to eliminate an unnatural feeling when the camera shake correction control is turned off. Additionally, during rapid panning, the moving amount of the camera by panning is very large with respect to the magnitude of the camera shaking. Therefore, an unnatural feeling does not occur even if camera shaking remains by turning off the camera shake correction control. That is, if the process that corrects shaking during panning as large blur is performed without performing the setting of step S504, the image stops upon the start of panning. Thereafter, the image significantly moves suddenly at the moment when the shift lens group 104 reaches the correcting end (the limit position of the control range), and consequently, the motion of the image looks very unnatural for the user.

In step S505, a process that gradually changes the output of the integrator 403 from the current data to the data of the initial position, and the shift lens group 104 moves to the initial position. This is because the shift lens group 104 is desirably positioned at the initial position in the drive range if the camera shake correction operation restarts next.

In contrast, if the process proceeds from step S502 to step S506 ("NO" in step S502), the panning control unit 407 sets the cut-off frequency of the HPF in the filter calculation unit 402 in accordance with the magnitude of the angular velocity data. This is because the influence of the camera shaking cannot be completely ignored if the slow panning is being performed. The process of step S506 is a process necessary for performing the camera shake correction while keeping the track ability of the image during panning from being unnatural.

Additionally, if the process proceeds from step S501 to step S507 ("NO" in step S501), the cut-off frequency of the HPF in the filter calculation unit 402 is set to a normal value. The normal value is a default setting value in the case in which the panning control is not performed.

After the process of step S506 or step S507, the process proceeds to step S508. If the panning operation is determined not to be rapid, in step S508, the panning control unit 407 releases the setting of the camera shake correction control being forced to turn off. Upon the ending of the process of step S505 or step S508, the panning control ends. A specific example will be described with reference to FIG. 7.

Figure 7:
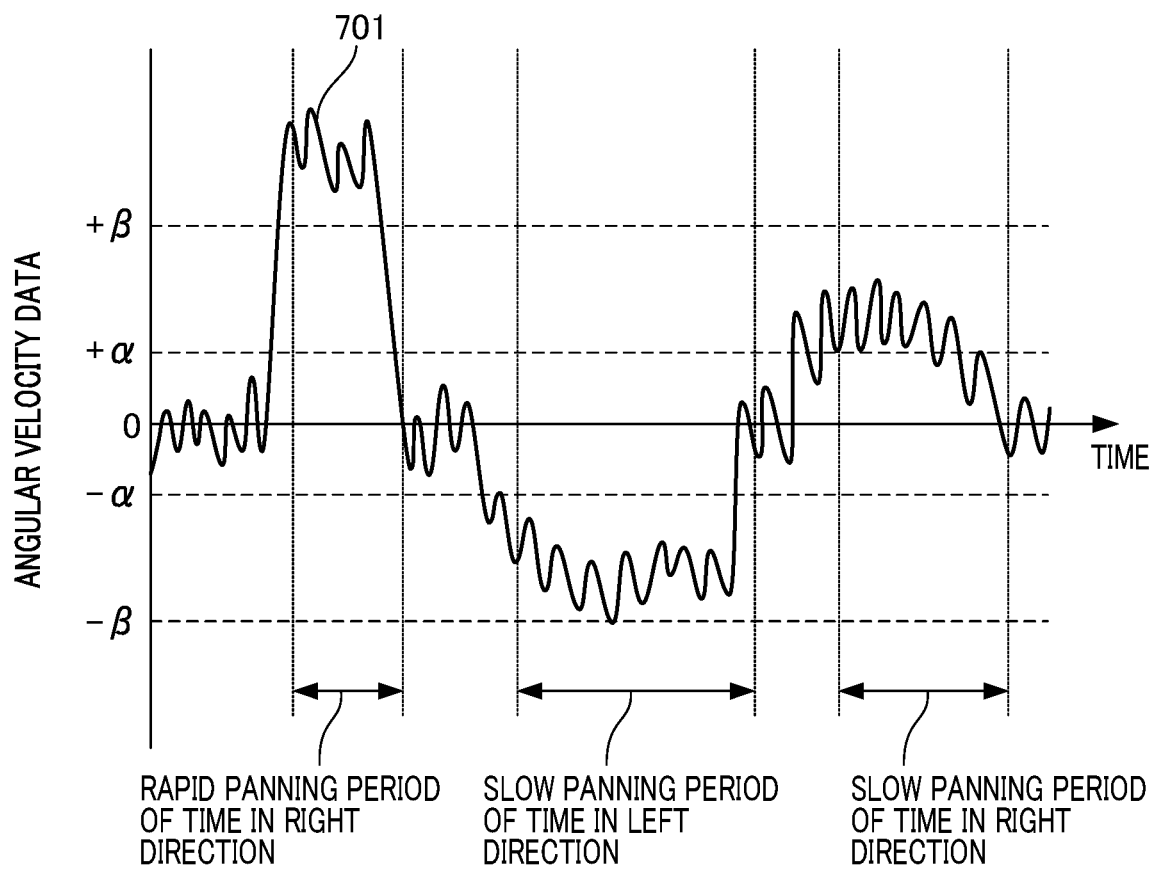
FIG. 7 is an explanatory view of a panning determination process.

FIG. 7 is a graph illustrating the relationship between the angular velocity data in the horizontal direction during panning, the predetermined value α (S501 in FIG. 5), and the predetermined value β (step S502 in FIG. 5). A graph line 701 illustrates the time change of the angular velocity data in which the sampling values of the angular velocity data are plotted. The example of FIG. 7 shows a case in which the output in the positive direction is provided if the user performs a panning operation of the imaging apparatus in the right direction and a case in which the output in the negative direction is provided if the user performs a panning operation of the imaging apparatus in the left direction. In FIG. 7, an example is illustrated in which a slow panning in the right and left direction has been detected immediately after a sudden panning in the right direction. The initial value of the angular velocity data is set to zero.

As can be seen from FIG. 7, the angular velocity data significantly deviates from the initial value during panning. Accordingly, if the drive target value of the shift lens group 104 is calculated by integrating the angular velocity data, the output value of the integrator 403 is very large due to a DC (direct current) offset component, thereby causing a loss of control. Hence, if panning is detected, the panning control unit 407 cuts the direct current (DC) component of the angular velocity data by changing the cut-off frequency of the HPF in the filter calculation unit 402 to a high value. In the case of a rapid panning operation, the output of the integrator 403 may be excessive, so setting is made to further increase the cut-off frequency of the HPF. In the case of especially rapid panning, the motion of the image according to the panning speed is very large with respect to camera shake, so even if the camera shake correction function is turned off for the panning direction, an unnatural feeling does not occur in particular.

It is possible to present a captured image without an unnatural feeling to the user during panning by performing the panning control as described above. Note that the control similar to the case of the panning control is performed also in a tilting control, except for the difference in the shooting direction, so the description thereof will be omitted.

If the panning shot assist mode is set by an operation switch included in the operation unit 116 of FIG. 3, the motion vector detection unit 135 in the camera signal processing circuit 114 detects motion vectors based on a plurality of captured images with different shooting times. While the panning shot assist mode is being set, the motion vector of the object detected from the captured image is output, and the control unit 130 acquires the motion vector data together with the angular velocity data detected by the angular velocity sensor 107.

The acquired angular velocity data corresponds to the panning shot speed of the imaging apparatus 100. Accordingly, if the difference between the angular velocity data and the angular velocity calculated from the moving amount of the main object on the image plane and the current focal length of the lens unit 101 is calculated, the calculated result is the angular velocity of the main object with respect to the imaging apparatus 100. The object angular velocity calculation unit 134 calculates the angular velocity of the main object in every frame at the time that the monitor image is processed and outputs the calculated angular velocity of the main object to the panning shot control unit 132. With reference to FIG. 6A, a drive control of the shift lens group 104 in the panning shot assist mode will be described.

Figure 6:
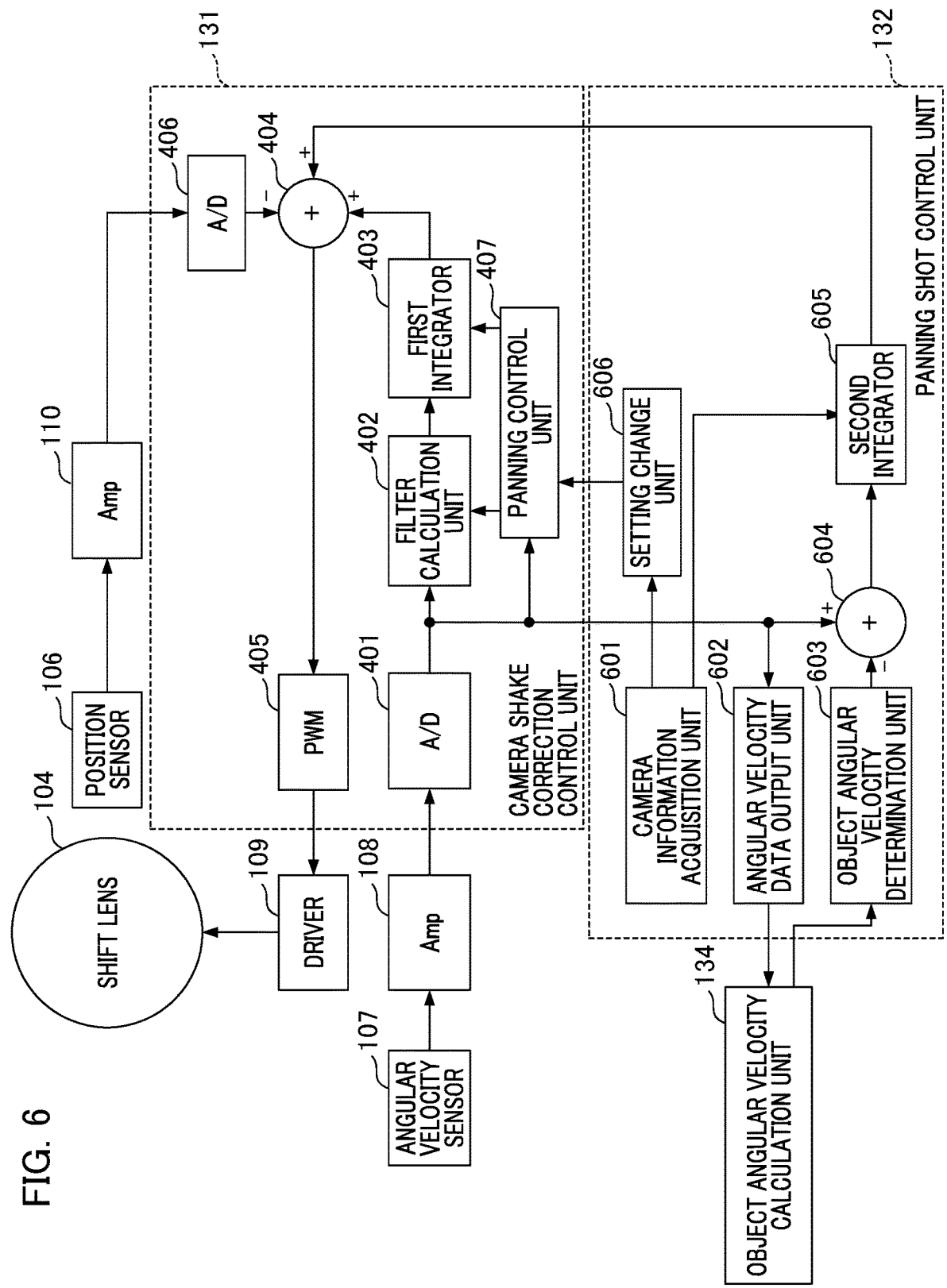
FIG. 6 is a configuration view of a panning shot control unit.

FIG. 6 is a block diagram illustrating a configuration example focusing on the panning shot control unit 132. In FIG. 6, the same reference numerals are provided for parts that are the same as those in FIG. 3 and FIG. 4, and a detailed description thereof will be omitted. A camera information acquisition unit 601 acquires setting information of the panning shot assist mode and release information. The release information is information showing a state corresponding to the operation of a release button included in the operation unit 116. If the user half-presses the release button, a first switch (denoted by "S1") is turned on, and if the release button is fully pressed, a second switch (denoted by "S2") is turned on. An angular velocity data output unit 602 samples the angular velocity data at a predetermined timing and outputs it to the object angular velocity calculation unit 134.

An object angular velocity determination unit 603 acquires the angular velocity of the main object calculated by the object angular velocity calculation unit 134 and determines the object angular velocity during exposure. The adder 604 acquires the angular velocity data by the angular velocity sensor 107 as a positive input from the A/D converter 401, and acquires the object angular velocity data during exposure from the object angular velocity determination unit 603 as a negative input. The adder 604 calculates the difference between the current angular velocity and the object angular velocity during exposure and outputs the calculated difference to an integrator 605. The integrator 403 in the camera shake correction control unit 131 serves as a first integrator and the integrator 605 in the panning shot control unit 132 serves as a second integrator. The second integrator 605 acquires the output of the adder 604 and performs an integration operation only for a predetermined period of time. The output of the second integrator 605 is transmitted to the adder 404 in the camera shake correction control unit 131 as a positive input. In this case, the adder 404 calculates the drive amount data of the shift lens group 104 by subtracting the output of the A/D converter 406, based on the result for adding the outputs of the integrators 403 and 605.

A setting change unit 606 changes the setting of the panning control unit 407 in accordance with the mode information acquired by the camera information acquiring unit 601. If the panning shot assist mode is set by the operation of the operation unit 116, notification about the mode information is provided from the camera information acquisition unit 601 to the setting change unit 606. The setting change unit 606 changes the setting of the panning control unit 407 in accordance with the mode information for which notification has been provided. The setting change performed here is a change to facilitate determination as a rapid panning state. Specifically, the predetermined values β and α for the panning determination described above are changed. Additionally, the adder 604 calculates a difference between the angular velocity detected by the angular velocity sensor 107 and the angular velocity of the main object, and outputs the difference to the second integrator 605. The second integrator 605 starts an integration operation by a signal indicating that it is an exposure period of time that has been acquired by the camera information acquisition unit 601. In another period of time other than the exposure period of time, the second integrator 605 outputs a value when the position of the shift lens group 104 becomes the reference position (for example, the center position). Here, if a process that disposes the shift lens group 104 at the reference position is to be performed during a period of time other than the exposure period of time, the shift lens group 104 will move steeply from the current position of the shift lens to the reference position upon end of the exposure period of time. Since the signal is read out from the image sensor 112 immediately after the end of the exposure period of time, however, the image disappears on the screen of the display unit 120. Therefore, the motion of the image due to the steep movement of the shift lens group 104 does not cause a problem.

If the photographer performs a panning shot while the panning shot assist mode is being set, the panning control unit 407 immediately reacts to perform panning control with respect the rapid panning condition, and the camera shake correction operation is prohibited. The shift lens group 104 moves by an amount corresponding to the difference between the angular velocity during panning of the imaging apparatus 100 and the object angular velocity, and the correction operation is performed. Specifically, the panning shot can be successfully achieved as a result for offsetting the difference between the panning speed of the imaging apparatus and the object angular velocity during the exposure period of time in the panning shot by the movement of the shift lens group 104.

Figure 2:
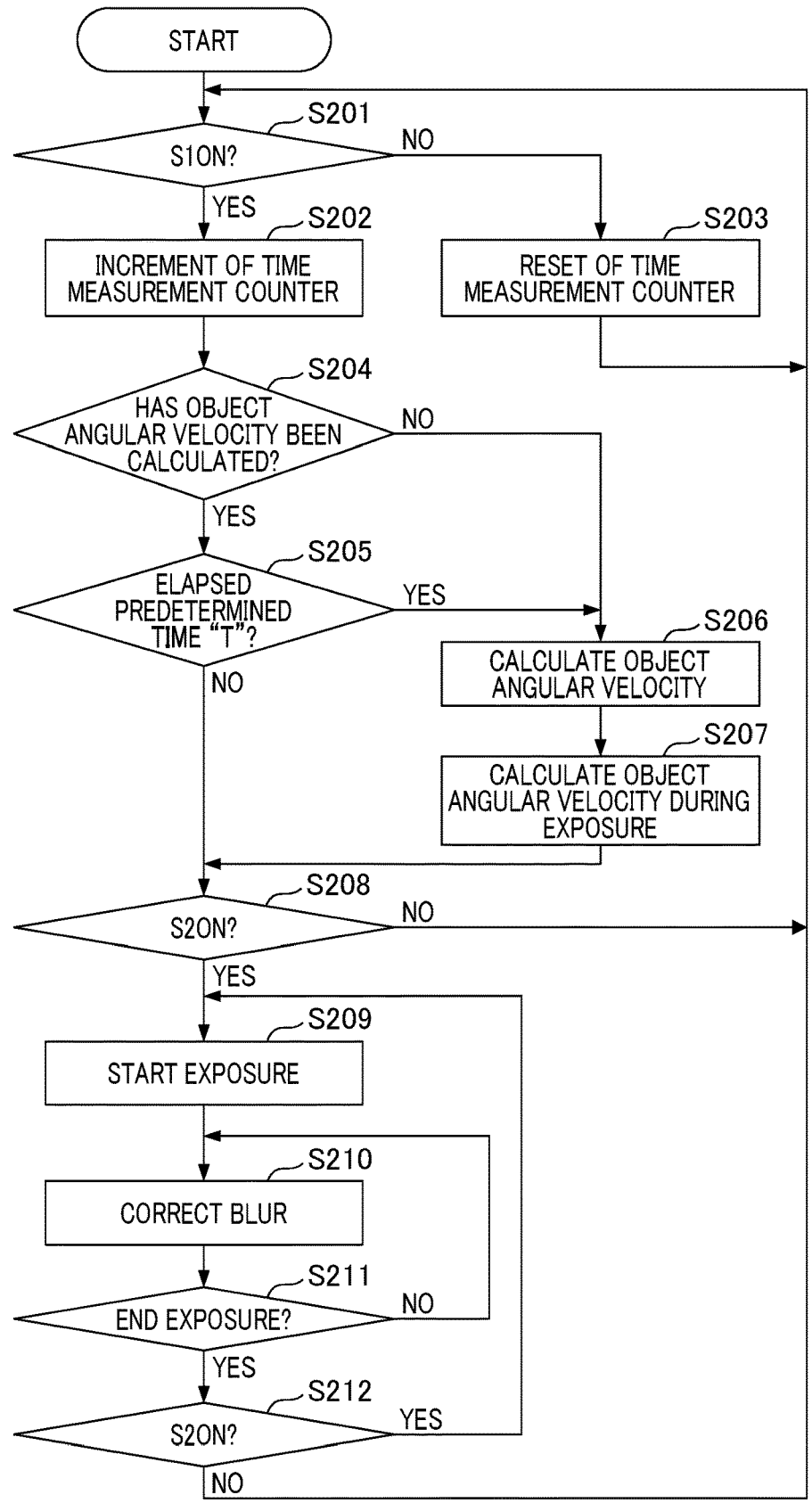
FIG. 2 is a flowchart that explains a process of a panning shot.

The shooting operation during the panning shot assist mode will be described with reference to the flowchart of FIG. 2. In step S201, the control unit 130 determines whether or not the release button is half-pressed and the first switch S1 is turned on. If the first switch S1 is turned on, the process proceeds to step S202, and, if the first switch S1 is off, the process proceeds to step S203. In step S202, the control unit 130 increments the internal time measurement counter and the process proceeds to step S204. Additionally, in step S203, the control unit 130 resets the time measurement counter before the process returns to step S201. In step S204, the control unit 130 determines whether or not the angular velocity of the main object has already been calculated. If the angular velocity of the main object has already been calculated, the process proceeds to step S205, and, if not, the process proceeds to step S206.

In step S205, the control unit 130 determines whether or not the time measured by the time measurement counter is equal to a predetermined time (referred to as "T"). The predetermined time T is a threshold time for determination, which has been set in advance. If it is determined that the time measured by the time measuring counter is equal to the threshold time and the predetermined time T has elapsed, the process proceeds to step S206. For example, if the angular velocity of the main object has not yet been calculated, or if the predetermined time T has elapsed after the time when the angular velocity of the main object was calculated the previous time, the process proceeds to step S206. Additionally, if it is determined that the predetermined time T has not elapsed, the process proceeds to step S208.

In step S206, the control unit 130 calculates the angular velocity of the main object. The reason why the angular velocity of the main object is calculated again when the predetermined time T has elapsed is that it is necessary to consider the possibility that the speed of the main object changes with the elapse of time. Every time the angular velocity of the main object is calculated, notification about the data of the angular velocity is provided to the object angular velocity determination unit 603 of the panning shot control unit 132. In the next step S207, the angular velocity is calculated from the object angular velocity in the predetermined number of frames in the past acquired from the object angular velocity calculation unit 134. The object angular velocity determination unit 603 determines an angular velocity value by calculating the object angular velocity during exposure by taking into account a time lag from the time when the first switch S1 is turned on to the exposure start time, by the operation of the release button. Next, the process proceeds to step S208.

In step S208, the control unit 130 determines whether or not the release button is fully pressed and the second switch S2 is turned on. If it is determined that the second switch S2 is turned on, the process proceeds to step S209. If the second switch S2 is off, the process returns to step S201. The exposure starts in step S209, and the shutter control unit 133 performs shutter control. In step S210, the panning shot control unit 132 operates simultaneously with the camera shake correction control unit 131 to control the movement of the shift lens group 104 and image blur correction on the object is performed. In step S211, the control unit 130 determines whether or not exposure has been completed. If the exposure has been completed, the process proceeds to step S212. If the exposure has not been completed, the process returns to step S210.

In step S212, the control unit 130 determines whether or not the release button has been fully pressed and the second switch S2 has been turned on. If it is determined that the second switch S2 has been turned on, the process proceeds to step S209 and the next shooting starts. If the second switch S2 is off in step S212, the process returns to step S201.

Figure 8:
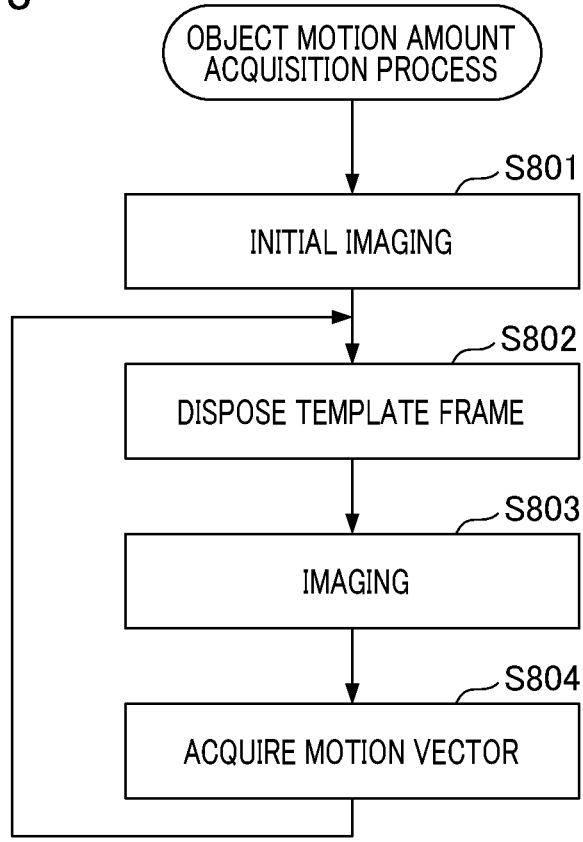
FIG. 8 is a flowchart that explains an acquisition process of a motion amount of an object.

Next, with reference to FIG. 8, a process that acquires a motion amount of the object will be described. FIG. 8 is a flowchart illustrating a process example in the motion vector detection unit 135. In step S801, the motion vector detection unit 135 acquires captured image data of the first time. The first imaging operation is performed, and the image data to be a comparison source (initial image) is acquired. In step S802, a frame (motion amount acquisition frame) for acquiring the motion vector of the object is set before the next imaging. A frame in which a plurality of motion amount acquisition frames are arranged in a captured image is referred to as a "template frame". A plurality of positions can be designated by the template frames if a motion vector is acquired. The position of the template frame is arranged to be the center of the image. This will be described with reference to the specific example of FIG. 9.

Figure 9:
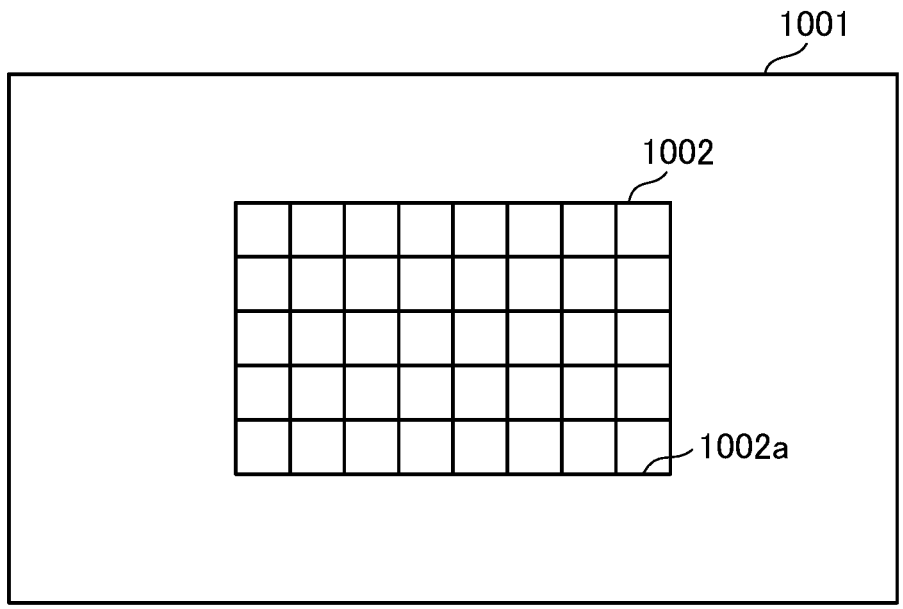
FIG. 9 is a schematic diagram illustrating an arrangement example of a template frame.

FIG. 9 illustrates a field angle 1001 and a template frame 1002. The template frame 1002 shown in FIG. 9 is a frame having 7 rows×5 columns in which seven motion amount acquisition frames 1002a are arranged in the horizontal direction and five motion amount acquisition frames 1002a are arranged in the vertical direction. Note that the template frame 1002 is not displayed on the screen during a live view in which the captured images are sequentially displayed. The number and the position of the motion amount acquisition frames 1002a in the template frame can optionally be set. For example, the motion amount acquisition frames 1002a may be set to a focused position by using an autofocus function.

In step S803 of FIG. 8, the next imaging operation is performed. The captured image at this time is compared with that of the previous time, and motion vectors at a plurality of positions are detected in accordance with the disposition of the template frame. In step S804, the detection result of the motion vector is acquired by the motion vector detection unit 135 and the result is output to the object angular velocity calculation unit 134. Subsequently, the process returns to step S802.

Next, the object angular velocity calculation unit 134 determines the angular velocity of the object based on the motion vector of the object acquired in step S804. The calculation of the object angular velocity will be described with reference to the flowchart of FIG. 1. The following process starts when the motion vector is acquired from the motion vector detection unit 135.

In step S101, the object angular velocity calculation unit 134 determines a first direction pertaining to the panning operation (hereafter, referred to as a "main panning direction"), based on the angular velocity data detected by the angular velocity sensor 107. Here, regarding the output of the angular velocity sensor 107, the output in the horizontal direction in a case in which the photographer holds the camera at the normal position in a standing posture is defined as the X direction output, and the output in the vertical direction is defined as the Y direction output. If the photographer holds the camera in the vertical position, the output in the horizontal direction is the Y direction output and the output in the vertical direction is the X direction output. Note that the information about the camera orientation is acquired from the orientation detection unit 137. Either the X direction or the Y direction having a greater angular velocity value is defined as the main panning direction. If the angular velocity value is the same in the X direction and the Y direction, the X direction is defined as the main panning direction.

Figure 10:
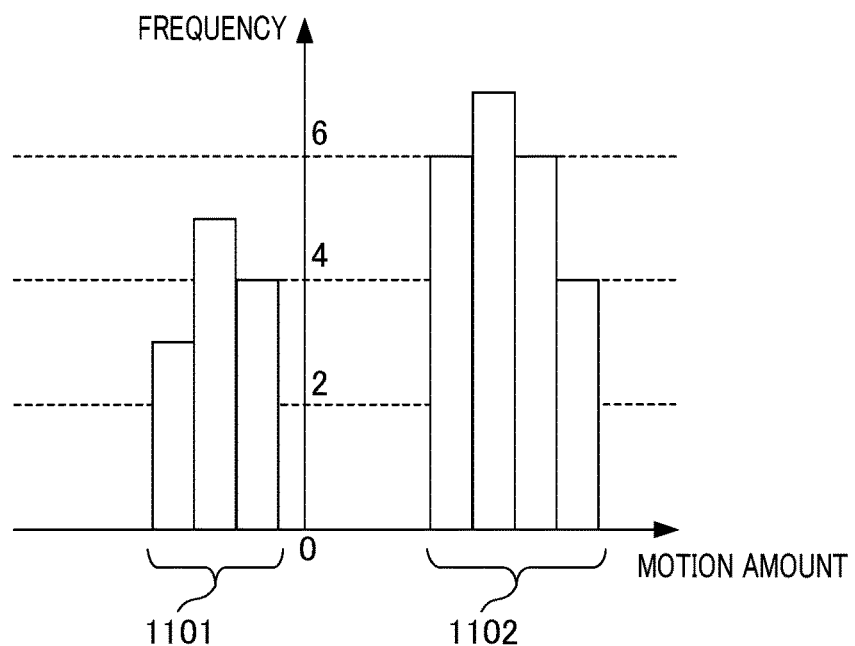
FIG. 10 illustrates a histogram of a motion amount.

In step S102, a histogram relating to the motion amount of the main panning direction component is generated from the motion vector that has been acquired, and a process that determines the motion amount of the object region and the background region is executed. A specific example is shown in FIG. 10. In the histogram illustrated in FIG. 10, the horizontal axis represents a motion amount and the vertical axis represents a frequency. The motion amount to be detected includes two types of the motion amount, that is, a motion amount corresponding to the main object on which the photographer tries to perform a panning shot and a motion amount corresponding to the flowing background. Since the purpose is a panning shot, the data with a small motion amount among the detected motion amounts serve as a motion amount of the main object. This motion amount is a motion amount [unit: pixel] on the image plane of the main object. In the example of FIG. 10, the motion amount of the first group 1101 is relatively close to zero, and the motion amount of the second group 1102 is relatively distant from zero. Hence, it is determined that the first group 1101 corresponds to the main object region and the second group 1102 corresponds to the background region. The average value related to the first group 1101 determined to be the main object region is determined to be a motion amount.

Figure 11:
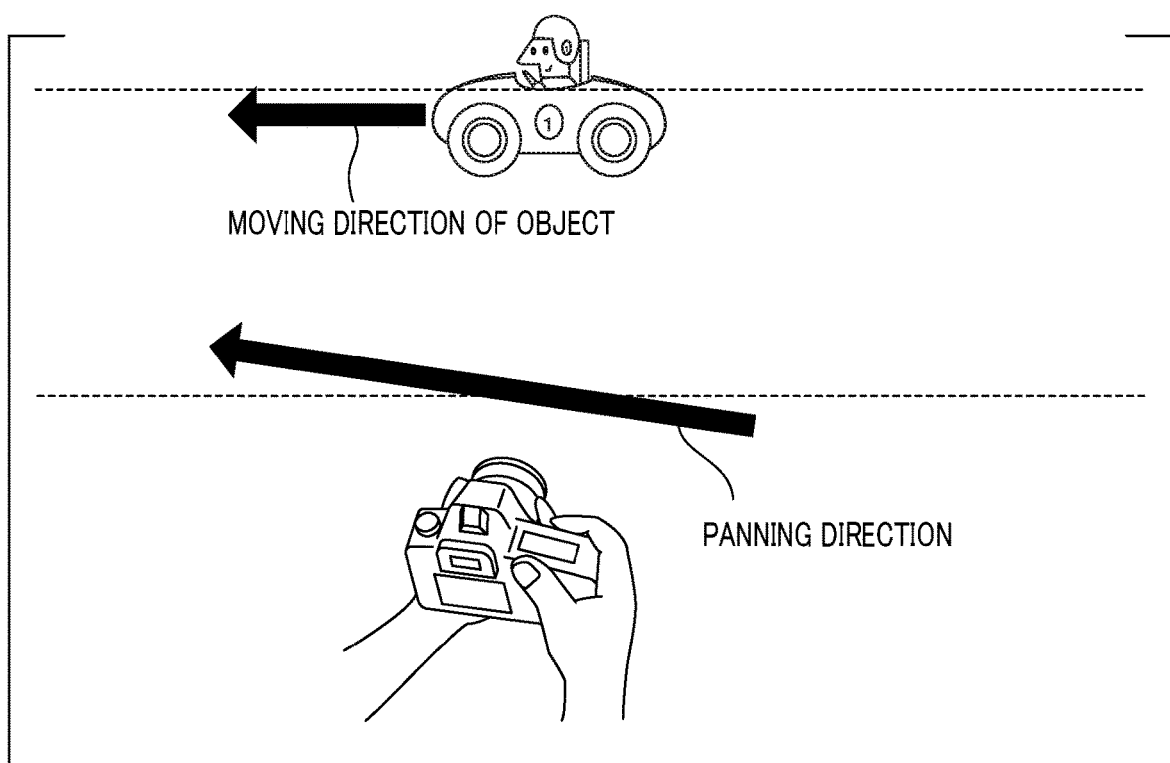
FIG. 11 illustrates a deviation between the moving direction of the object and the panning direction.

Here, with reference to FIG. 11, FIG. 12A, and FIG. 12B, a description will be given of a deviation between the moving direction of the object and the panning direction of the imaging apparatus. FIG. 11 is a schematic diagram illustrating the panning direction of the imaging apparatus with respect to the moving direction of the object. If the panning direction is not parallel to the moving direction of the object and there is an angle between the directions, it is difficult to suppress image blur of the object image.

Figure 12A:
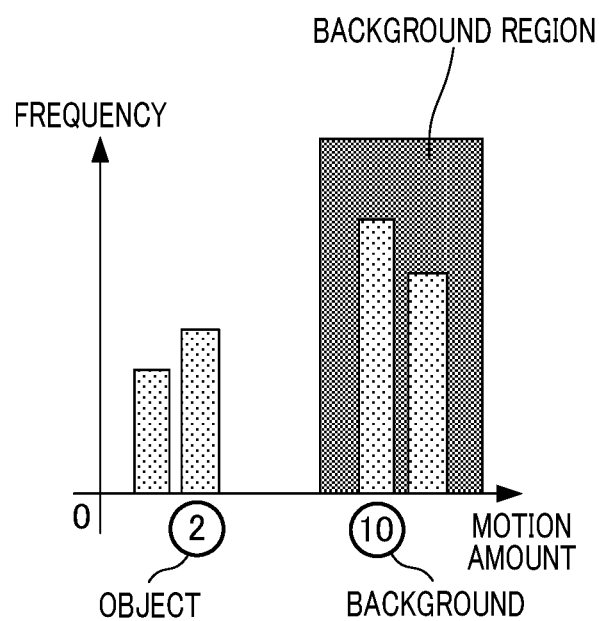
FIGS. 12A and 12B illustrate histograms of motion amounts in a direction orthogonal to the panning direction.
Figure 12B:
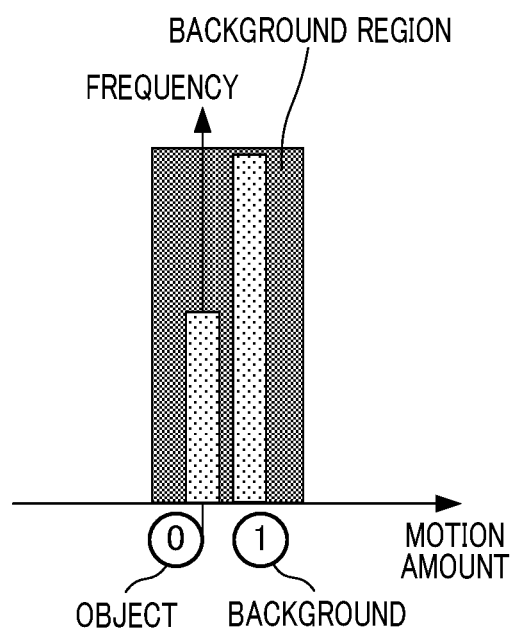

FIGS. 12A and 12B are frequency distribution diagrams illustrating distribution examples of the motion vectors detected from a captured image. FIG. 12A illustrates an example in which the motion amount of the object region is in the vicinity of 2 and the motion amount of the background region is in the vicinity of 10, as an example of the distribution of the motion vector in the horizontal direction (X direction) of the shooting screen. In this case, since the purpose is a panning shot, the one distribution with a greater motion amount shows a background region. In other words, the background region is specified in the vicinity of the motion amount 10 and the object region is specified in the vicinity of the motion amount 0.

FIG. 12B illustrates a distribution example of a motion vector in the vertical direction (Y direction) of the shooting screen. The motion amounts of the object region and the background region are both in the vicinity of 0 and the difference in the motion amount is small, so that it is difficult to specify the background region and the object region. That is, since, in the horizontal direction, the background region, and the object region can be separated, it is possible to calculate an accurate angular velocity of the object. In contrast, in the vertical direction, due to the difficulty in separating the background region and the object region, it is impossible to obtain an accurate angular velocity of the object. Consequently, a remaining blur may appear in the image. Accordingly, in the present embodiment, in order to more accurately determine the main object region, the following process is executed.

Figure 1:
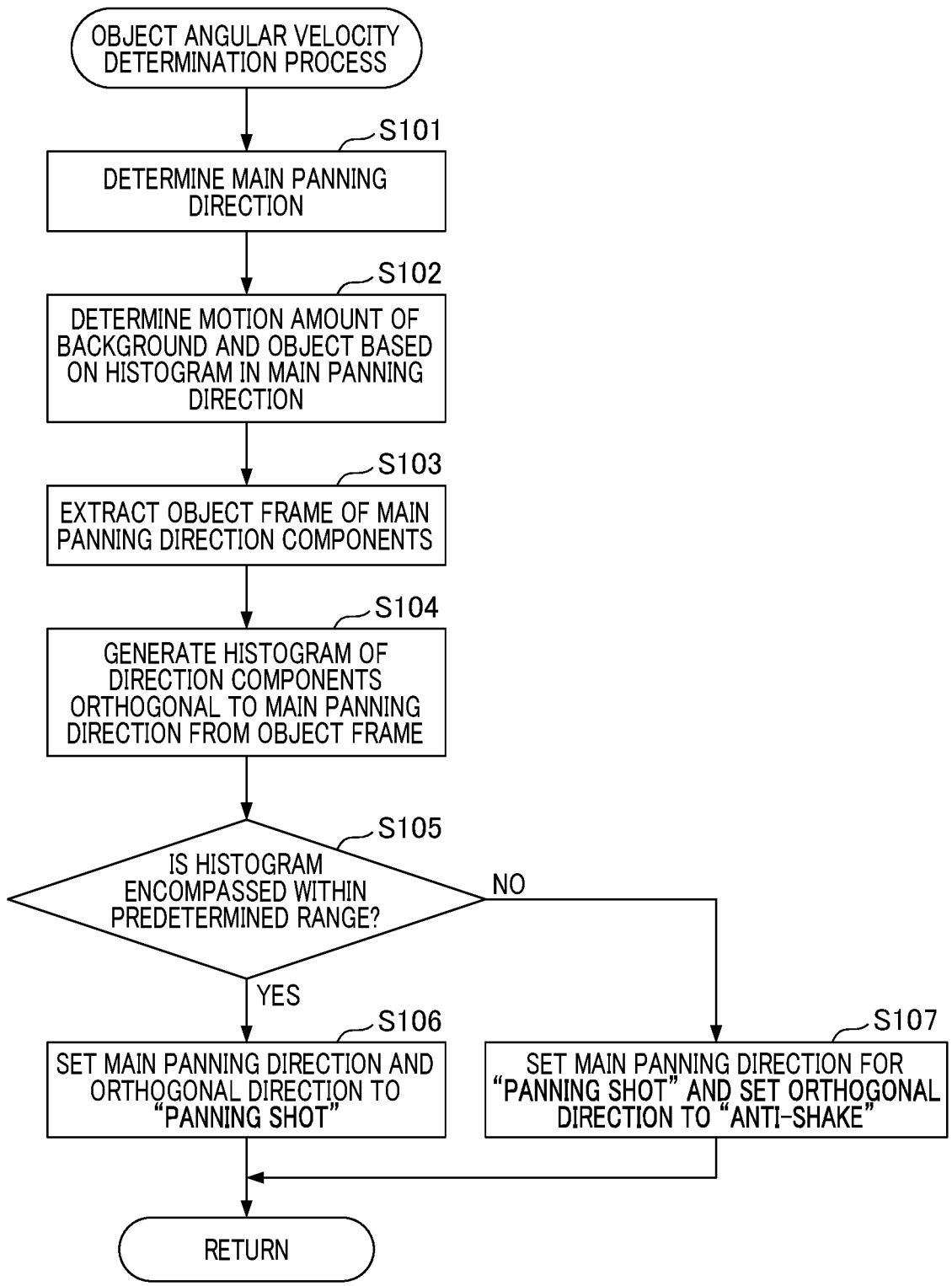
FIG. 1 is a flowchart that explains the determination of an object angular velocity in the first embodiment of the present invention.
Figure 13:
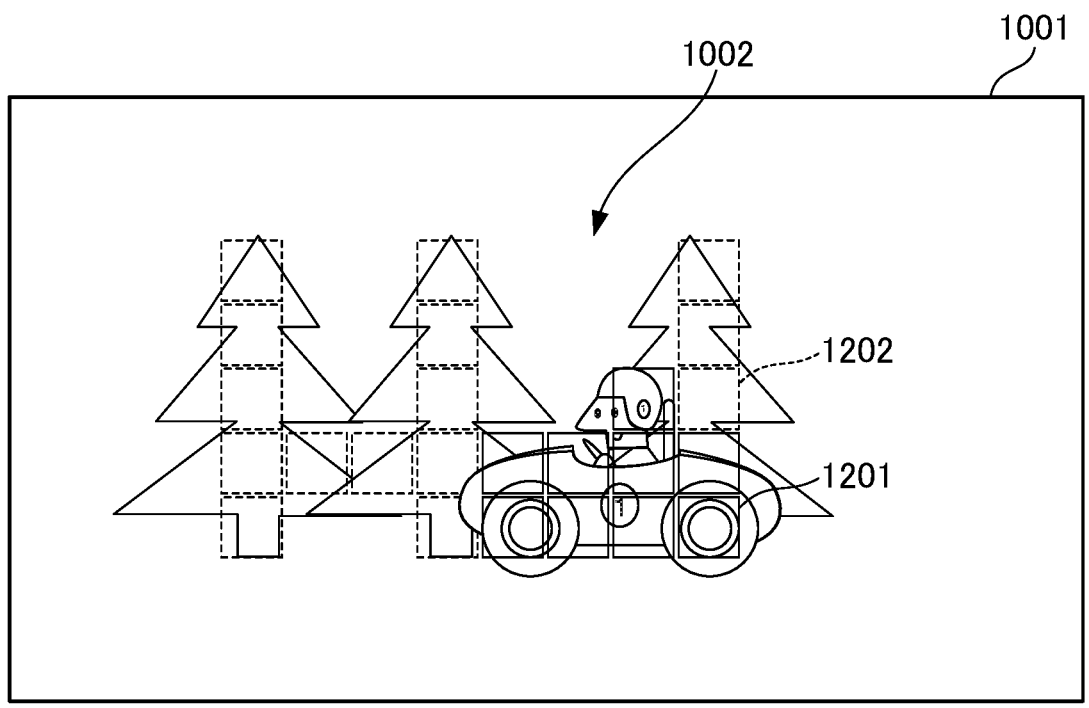
FIG. 13 illustrates an object frame and a background frame that have been detected.

In step S103 of FIG. 1, a frame in which a group of motion amounts corresponding to the region determined to be the main object by the main panning direction component has been output is extracted as the main object frame. For example, if a template frame is disposed as shown in FIG. 9, a specific example is shown in FIG. 13. A frame 1201 represents an object frame in which a group of motion amounts corresponding to the region determined to be the main object has been output. A frame 1202 represents a background frame in which a group of motion amounts corresponding to the region determined to be the background has been output. In step S103, the object frame 1201 is extracted.

Figure 14A:
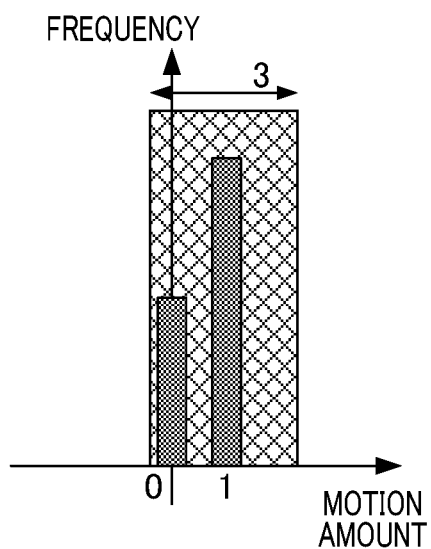
FIGS. 14A and 14B illustrate histograms of motion amounts.
Figure 14B:
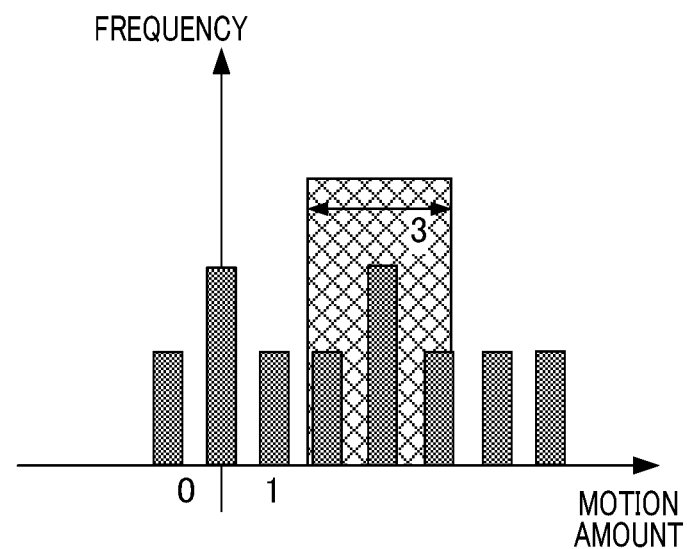

In step S104, a histogram is generated for the motion amount of the direction component orthogonal to the main panning direction based on the motion amount of the object frame. A direction orthogonal to the main panning direction (first direction) is the second direction, and hereafter is also simply referred to as the "orthogonal direction". In the next step S105, the object angular velocity calculation unit 134 determines whether or not the histogram data generated in step S104 is encompassed within a predetermined range. If the histogram data generated in step S104 is encompassed within the predetermined range, it is determined that the main object can be detected also for the direction component orthogonal to the main panning direction, and the process proceeds to step S106. Additionally, if the histogram data generated in step S104 is not encompassed within the predetermined range, it is determined that the main object cannot be detected for the direction component orthogonal to the main panning direction, and the process proceeds to step S107. A specific example will be described with reference to FIGS. 14A and 14B. In FIGS. 14A and 14B, the predetermined range will be described to serve as a predetermined fixed range.

FIG. 14A illustrates a case of distribution in which the difference between the maximum value and the minimum value of the motion amount centered on the average value of the histogram data is concentrated within 3 pixels. In this case, it is determined that the main object can be detected by the direction component orthogonal to the main panning direction, and the average value of the group of motion amounts is determined as a motion amount of the main object in the orthogonal direction. In contrast, FIG. 14B illustrates a case of dispersed distribution in which the difference between the maximum value and the minimum value of the motion amount centered on the average value of the histogram data is not encompassed within 3 pixels. In this case, it is determined that the main object cannot be detected by the direction component orthogonal to the main panning direction.

In another embodiment, data for several seconds about a change in the motion amount of the main object in the direction orthogonal to the main panning direction is stored in the memory. It is determined whether image blur correction taking into account the change in the motion amount stored in the memory is performed or camera shake correction not taking into account the change in the motion amount is performed. In that case, if the histogram data is encompassed within the predetermined range in step S105 and the change in the motion amount of the main object that has been stored is small, the process proceeds to step S106. Additionally, if it is determined that the change in the motion amount is large or if the histogram data is not encompassed within the predetermined range, the process proceeds to step S107. Note that the predetermined range described in step S105 may be a variable range that is changed depending on the shooting conditions such as a focal length, rather than a fixed range. At that time, a table showing the relationship between the focal length and the predetermined range is stored in the memory in the object angular velocity calculation unit 134, and the predetermined range is changed by referring to the data of the table.

In step S106 of FIG. 1, in order to perform image blur correction of the object image in both the main panning direction and the orthogonal direction (in FIG. 1, referred to as "panning shot"), the object angular velocity calculation unit 134 converts the motion amounts in both directions into an angular velocity by using the focal length information and the pixel pitch. The angular velocity of the object calculated by taking into account the angular velocity acquired from the angular velocity sensor 107 is output to the panning shot control unit 132, and the process ends.

In step S107 of FIG. 1, the object angular velocity calculation unit 134 performs image blur correction of the object image in the main panning direction. In contrast, in the direction orthogonal to the main panning direction, the object angular velocity calculation unit 134 performs only the camera shake correction control rather than performing image blur correction of the object image (in FIG. 1, referred to as "set to anti-shake"). Specifically, in the main panning direction, a process that converts the motion amount into an angular velocity by using the focal length information and the pixel pitch is performed, and the angular velocity of the object calculated by taking into account the angular velocity acquired from the angular velocity sensor 107 is output to the panning shot control unit 132. In contrast, in the direction orthogonal to the main panning direction, the angular velocity acquired from the angular velocity sensor 107 is output to the panning shot control unit 132, and consequently, only the camera shake correction is performed. Alternatively, the user is notified that only the camera shake correction process is to be performed, and the camera shake correction process is executed. After the process of step S107, a series of processes ends.

Note that if, in step S105 of FIG. 1, only zero exists as a motion amount of the histogram, the process proceeds to step S106. In this case, it is assumed that the object angular velocity is zero and neither image blur correction of the object image nor camera shake correction is performed in the direction orthogonal to the main panning direction.

In the imaging apparatus of the present embodiment, the main panning direction is determined, and the moving amount of the object in the direction orthogonal to the main panning direction is calculated based on the position of the object frame determined in the main panning direction. If the moving amount is encompassed within the predetermined range, the blur correction of the object image is performed. As a result, even in a scene in which it is impossible to separate the object region and the background region in the direction orthogonal to the main panning direction, blur correction of the object image in the direction orthogonal to the main panning direction can be performed. Therefore, it is possible to provide an imaging apparatus that enables advantageous image blur correction.

In the present embodiment, in a panning shot, control that switches between a first control that corrects the image blur of the object image in the horizontal direction and the vertical direction in the shooting screen, and a second control that corrects the image blur of the object image in either the horizontal direction or the vertical direction in the shooting screen, is performed. In other words, in the panning shot, control that switches between the first control that corrects the image blur of the object image in the direction orthogonal to the direction of panning shot and the second control that does not correct the image blur of the object image in the direction orthogonal to the direction of panning shot, is performed. If a panning operation, and the like, that change the shooting direction of the imaging apparatus are performed, it is possible to more accurately determine the object by switching between the determination methods of the motion vector and thereby perform image blur correction of the object image. In the present embodiment, an object frame in the main panning direction is extracted, and the moving amount of the object region in the direction orthogonal to the object frame is calculated. The present invention is not limited thereto, and a background frame in the main panning direction may be extracted in step S103 of FIG. 1 and a moving amount in a direction orthogonal to the frame excluding the background frame may be calculated in step S104.

Second Embodiment

Figure 15:
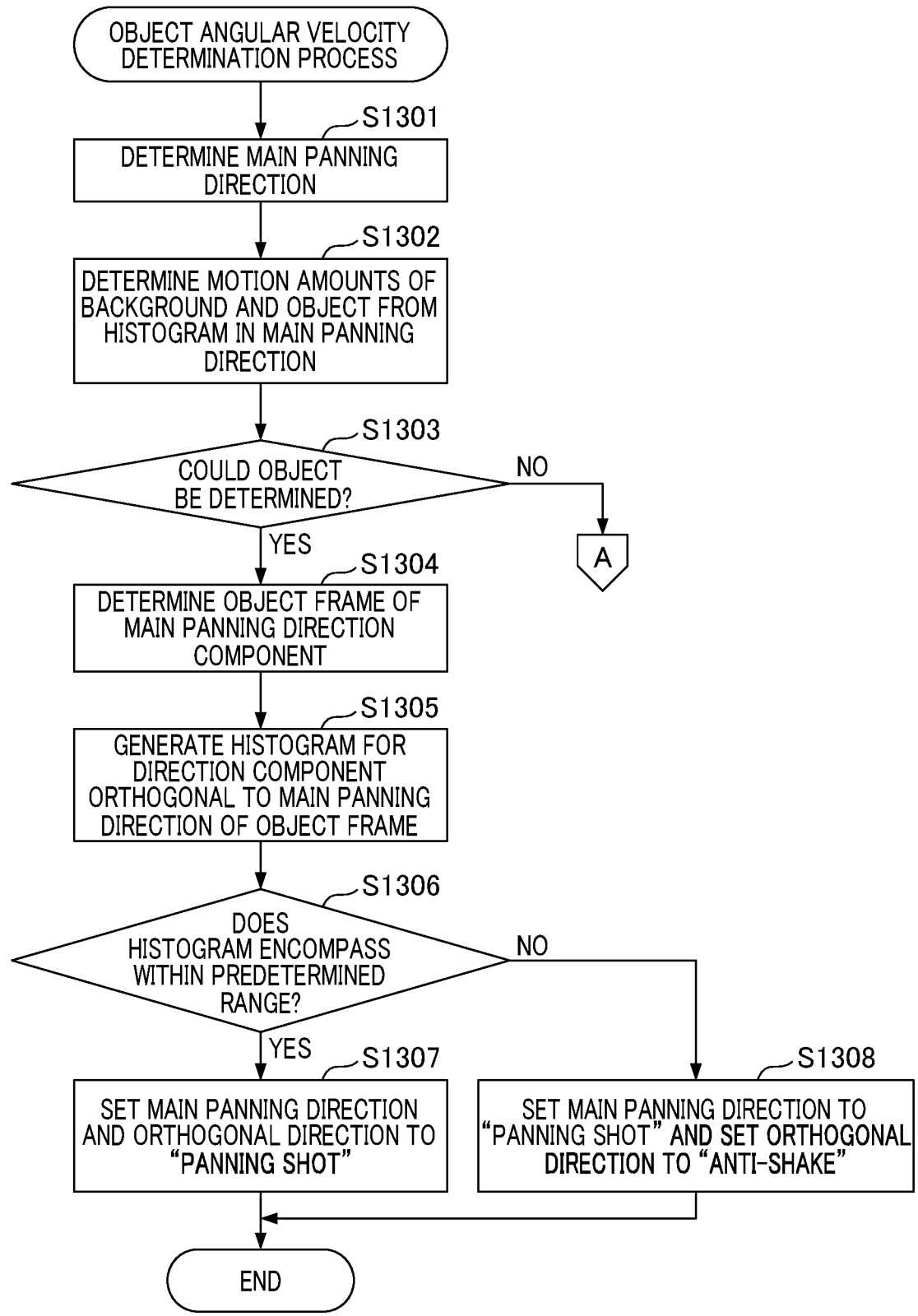
FIG. 15 is a flowchart that explains the determination of the object angular velocity in the second embodiment of the present invention.
Figure 16:
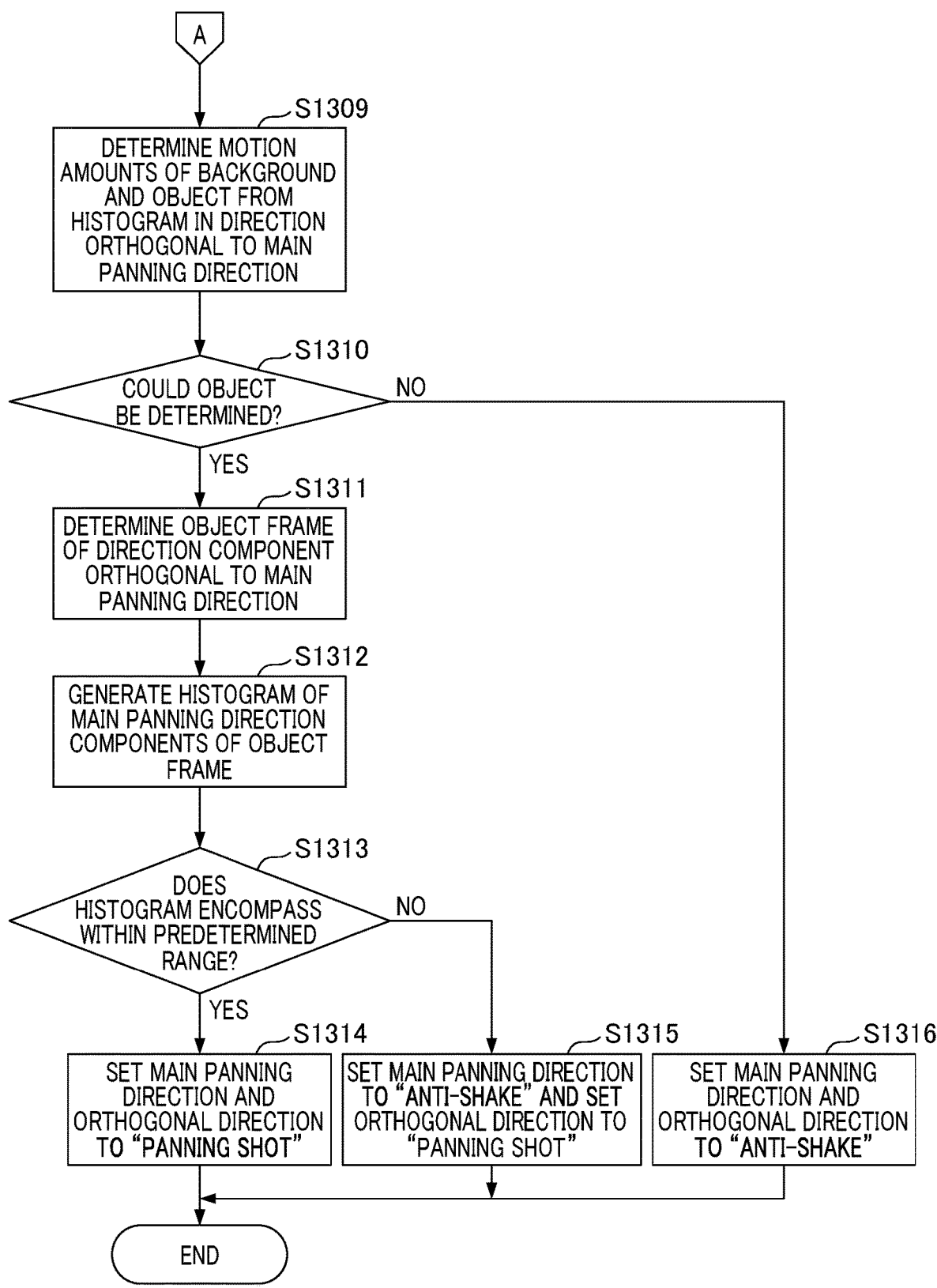
FIG. 16 is a flowchart that explains a process following FIG. 15.

Next, a second embodiment of the present invention will be described. In the present embodiment, the same reference numerals are provided for parts that are the same as those in the first embodiment and the detailed description thereof will be omitted, and mainly the differences will be described. FIG. 15 and FIG. 16 are flowcharts illustrating a calculation process of the object angular velocity in the present embodiment. The following processes start at the timing when the object angular velocity calculation unit 134 acquires a motion vector from the motion vector detection unit 135.

In step S1301, the main panning direction is determined based on the angular velocity data similar to step S101 of FIG. 1. In step S1302, a histogram of the main panning direction component (X direction or Y direction) is generated based on the motion vector in a manner similar to step S102 of FIG. 1, and the motion amounts of the object region and the background region are determined.

In step S1303, the object angular velocity calculation unit 134 determines whether or not the motion amount of the object region could be determined. For example, if the background region and the object region could be separated from each other by using the output of the angular velocity sensor 107 as shown in FIG. 12A, the process proceeds to step S1304.

In contrast, as shown in FIG. 12B, if the background region and the object region could not be separated from each other, the process proceeds to step S1309 of FIG. 16. In step S1304, in a manner similar to step S103 of FIG. 1, a frame that serves as the main object in the disposed template frame is extracted based on the region determined to be the main object by the main panning direction component.

In step S1305, similarly to step S104 of FIG. 1, a histogram is generated for the motion amount of the direction component orthogonal to the main panning direction, based on the motion amount of the object frame. In step S1306, in a manner similar to step S105 of FIG. 1, it is determined whether the histogram data generated in step S1305 is encompassed within a predetermined range. If it is determined that the histogram data is encompassed within the predetermined range, the process proceeds to step S1307, and if it is determined that the histogram data is not encompassed within the range, the process proceeds to step S1308.

In step S1307, in a manner similar to step S106, in order to perform blur correction of the object image in both directions of the main panning direction and the orthogonal direction, the motion amounts in both directions are converted into the angular velocity by using the focal length information and the pixel pitch. The angular velocity of the object calculated by taking into account the angular velocity acquired from the angular velocity sensor 107 is output to the panning shot control unit 132, and the process ends.

In step S1308, in a manner similar to step S107, blur correction of the object image is performed in the main panning direction, and in the direction orthogonal to the main panning direction, only camera shake correction is performed, rather than performing the blur correction of the object image. Specifically, the motion amount in the main panning direction is converted into the angular velocity by using the focal length information and the pixel pitch, and the angular velocity of the object calculated by taking into account the angular velocity acquired from the angular velocity sensor 107 is output to the panning shot control unit 132. In contrast, for the direction orthogonal to the main panning direction, the angular velocity acquired from the angular velocity sensor 107 is output to the panning shot control unit 132, and consequently, only the camera shake correction is performed. Alternatively, the user is notified that only camera shake process is to be performed, and the process of camera shake correction is executed. After the process of step S1308, a series of processes ends.

In step S1303, if the background region and the object region could not be separated from each other in the main panning direction, in step S1309, a histogram is generated for the motion amount of direction components orthogonal to the main panning direction based on the motion vector that has been acquired, and the motion amounts of the object and the background are determined. In step S1310, in a manner similar to step S1303, it is determined whether or not the background region and the object region could be separated from each other. If the background region and the object region could be separated from each other in the orthogonal direction, the process proceeds to step S1311, and, if the background region and the object region could not be separated from each other, the process proceeds to step S1316.

In step S1311, based on the region determined to be the main object with respect to the direction component orthogonal to the main panning direction, a frame to be the main object in the disposed template frame is extracted. In step S1312, a histogram is generated for the moving amount of the main panning direction component based on the motion amount of the object frame. In step S1313, it is determined whether or not the histogram data is encompassed within a predetermined range. If it is determined that the histogram data is encompassed within the predetermined range, the process proceeds to step S1314, and if not, the process proceeds to step S1315.

In step S1314, blur correction of the object image is performed in both the main panning direction and the orthogonal direction. Additionally, in step S1315, only camera shake correction is performed in the main panning direction, rather than performing blur correction of the object image. Blur correction of the object image is performed in the direction orthogonal to the main panning direction.

If the object region and the background region could not be separated from each other in both of the main panning direction and the orthogonal direction, the process proceeds from step S1310 to step S1316. In step S1316, only camera shake correction is performed while blur correction of the object image is not performed in both the main panning direction and the orthogonal direction.

According to the present embodiment, even if an object could not be detected in the main panning direction, a process that detects an image region of the main object from the direction orthogonal to the main panning direction is performed. If a region corresponding to the main object is detected in the orthogonal direction, the motion amount of the object in the main panning direction is calculated to serve the region corresponding to the main object as a reference, and the blur correction of the object image is performed. As a result, it is possible to perform the blur correction of the object image in the direction orthogonal to the main panning direction even in a scene in which the object and the background cannot be separated in the main panning direction. Therefore, it is possible to provide an imaging apparatus that enables advantageous image blur correction.

Other Embodiments

Embodiments of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or the apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A blur correction device comprising:
   (A) a memory; and
   (B) at least one processor that executes a program stored in the memory to function as:
   (a) a detection unit configured to detect motion information between a plurality of images imaged by an imaging apparatus, the detection unit detecting motion information of a plurality of image regions;
   (b) a determination unit configured to determine a target region, from among the plurality of image regions, based on motion information of the imaging apparatus and motion information of a first direction detected by the detection unit; and
   (c) a correction control unit configured to switch between (i) a control operation in which the correction control unit corrects an image blur in a second direction of an object present in the target region based on motion information of the second direction orthogonal to the first direction in the target region determined by the determination unit, and (ii) a control operation in which the correction control unit does not correct the image blur in the second direction.

2. The blur correction device according to claim 1, wherein the correction control unit corrects an image blur in the second direction of the object present in the target region by moving a correction member based on the motion information of the second direction of the target region.

3. The blur correction device according to claim 1, wherein the correction control unit corrects the image blur in the second direction of the object present in the target region based on the motion information of the second direction in the target region if the motion information of the second direction in the target region is encompassed within a predetermined range.

4. The blur correction device according to claim 3, wherein the correction control unit corrects the image blur in the second direction based on the motion information of the imaging apparatus if the motion information of the second direction in the target region is not encompassed within the predetermined range.

5. The blur correction device according to claim 3, wherein the correction control unit changes the predetermined range in accordance with shooting conditions, including a focal length.

6. The blur correction device according to claim 1, wherein the detection unit detects a motion vector that serves as the motion information.

7. The blur correction device according to claim 1, wherein the correction control unit corrects the image blur in the first direction of the object present in the target region based on the motion information of the first direction in the target region.

8. An imaging apparatus comprising:
(A) an imaging element;
(B) a memory; and
(C) at least one processor that executes a program stored in the memory to function as:
(a) a detection unit configured to detect motion information between a plurality of images imaged by using the imaging element, the detection unit detecting motion information of a plurality of image regions;
(b) a determination unit configured to determine a target region from among the image regions based on motion information of the imaging apparatus and motion information of a first direction detected by the detection unit; and
(c) a correction control unit configured to switch between (i) a control operation in which the correction control unit corrects an image blur in a second direction of an object present in the target region based on motion information of the second direction orthogonal to the first direction in the target region determined by the determination unit, and (ii) a control operation in which the correction control unit does not correct the image blur in the second direction.

9. The imaging apparatus according to claim 8, wherein the correction control unit corrects an image blur in the second direction of the object present in the target region by moving a correction member based on the motion information of the second direction of the target region.

10. The imaging apparatus according to claim 8, wherein the correction control unit corrects the image blur in the second direction of the object present in the target region based on the motion information of the second direction in the target region if the motion information of the second direction in the target region is encompassed within a predetermined range.

11. The imaging apparatus according to claim 10, wherein the correction control unit corrects the image blur in the second direction based on the motion information of the imaging apparatus if the motion information of the second direction in the target region is not encompassed within the predetermined range.

12. The imaging apparatus according to claim 10, wherein the correction control unit changes the predetermined range in accordance with shooting conditions including a focal length.

13. The imaging apparatus according to claim 8, wherein the detection unit detects a motion vector that serves as the motion information.

14. The imaging apparatus according to claim 8, wherein the correction control unit corrects the image blur in the first direction of the object present in the target region based on the motion information of the first direction in the target region.

15. The imaging apparatus according to claim 8, further comprising (D) an inertial sensor that detects motion information of the imaging apparatus.

16. A blur correction method comprising:
detecting motion information between a plurality of image imaged by an imaging apparatus in a plurality of image regions;
determining a target region from among the image regions based on motion information of the imaging apparatus and motion information of a first direction that has been detected; and
switching between (i) a control operation in which an image blur in a second direction of an object present in the target region is corrected based on motion information of the second direction orthogonal to the first direction in the target region that has been determined, and (ii) a control operation in which the image blur in the second direction is not corrected.

* * * * *